United States Patent [19]  
Sgrignoli

[11] Patent Number: 4,885,794  
[45] Date of Patent: Dec. 5, 1989

[54] METHOD AND APPARATUS FOR PROTECTION OF CHANNEL ACCESS IN BROADBAND CABLE COMMUNICATIONS SYSTEMS

[75] Inventor: Gary J. Sgrignoli, Mt. Prospect, Ill.

[73] Assignee: Zenith Electronics Corporation, Glenview, Ill.

[21] Appl. No.: 41,818

[22] Filed: Apr. 23, 1987

[51] Int. Cl.⁴ .............................................. H04H 1/02
[52] U.S. Cl. ....................................... 455/5; 455/126; 455/3; 358/86; 370/85.15; 340/825.5
[58] Field of Search ....................... 455/2, 4, 5, 126, 3; 358/84, 86; 340/825.5, 825.06; 370/85, 13, 96, 94, 86

[56] References Cited

U.S. PATENT DOCUMENTS 4,455,570  6/1984  Saeki et al. ........................ 455/5 X
4,554,579 11/1985  Citta ..................................... 358/86
4,586,078  4/1986  Citta et al. ............................ 358/86
4,617,565 10/1986  Nakata et al. .................... 340/825.5
4,692,919  9/1987  West, Jr. ............................. 370/96
4,700,344 10/1987  Kaino et al. .......................... 370/94
4,701,910 10/1987  Ulug ..................................... 370/85

Primary Examiner—Robert L. Griffin
Assistant Examiner—Ralph Smith

[57] ABSTRACT

In a cable television system or other broadband cable communications network, improved throughput of inbound data communications by a plurality of transceivers transmitting on a predetermined frequency to a headend facility is provided by an apparatus and method for limiting the time period of the transmissions from failed transceivers. Transceiver failure in a transmitting mode can deprive effective access to the inbound channel to all of the aforesaid plurality of transceivers coupled to a system. In a preferred embodiment the transceiver modulator is disabled upon indication that the transceiver has been generating an inbound signal longer than a certain maximum time. Two protective stages are provided which respond to different indicia that an inbound signal is being generated and these stages then act on separate facilities of the modulator to prevent its operation. At least one protective stage is embodied in strictly passive circuit elements to improve reliability.

17 Claims, 2 Drawing Sheets

METHOD AND APPARATUS FOR PROTECTION OF CHANNEL ACCESS IN BROADBAND CABLE COMMUNICATIONS SYSTEMS

BACKGROUND

The invention disclosed relates to an improved transceiver and method for transceiver operation in cable television or similar broadband cable communications systems.

Cable-television systems have, in recent years, moved beyond merely providing television signals by cable to system subscribers in their homes. The subscriber has been given a voice in many systems. These advantaged subscribers have transceivers which allow them to transmit signals to the controlling or headend facility of the system. Among the many services which subscribers use through such signals are the purchase of extra-cost special programs and home shopping on television catalogue services.

A subscriber sends a signal to the headend facility through a keyboard or other generating means connected to his transceiver. His entry to the keyboard is encoded in a digital format and becomes, potentially with the address of his station and other enabling data, a data packet for transmission to the headend facility. The data packet is used to modulate a radio frequency carrier wave and is transmitted to the headend facility through the cable plant of the cable television system.

The cable plant is the communications medium of a cable television system or local area network. Typically, it comprises a broadband transmission cable over which signals are transmitted from the headend facility to home transceivers (outbound signals) as well sa from home transceivers to the headend facility (inbound signals). Broadband coaxial cables are advantageously used in this application because, inter alia, they support a large frequency bandwidth and provide signal shielding at a moderate cost in comparison to other media. The wide frequency bandwidth permits the definition of a substantial number of channels on the cable allowing simultaneous inbound and outbound signals. Each signal occupies a particular channel, i.e. frequency bandwidth, on the cable.

A given channel can effectively support only one signal at a time. If more than one signal appears simultaneously on a channel, one signal source will dominate the detectors listening to the channel, excluding all weaker signal sources while it is transmitting, or, where the signal strength of individual transmitters is more or less equal, the signals will interfere with one another and the intelligence comprehended by each signal will be confused with that of other signals. In either case, access by some or all transceivers is lost. Were channel availability on a coaxial cable unlimited, such matters would be of no consequence. Each subscriber could be given a dedicated channel on the cable for access to the headend facility. Of course, this is not the case. The number of channels available is always far less than the number of subscribers desiring to use the system.

However, subscriber-initiated inbound signals are typically of short duration. Such a signal, in the equipment with which the invention is associated in cable-television systems, lasts only 1.6 microseconds. Nor will signals typically be initiated by a subscriber with great frequency.

Accordingly, the system designer should only need to assign one or, at most, a handful of channels to accomodate all inbound signals generated by subscribers. He may do so in anticipation of the short duration and relative paucity of signals from any given subscriber. A single channel may potentially be used for thousands of subscribers without interference between signals becoming apparent to the subscriber.

The system designer's ability to rely on a single channel to accomodate all subscribers will flow from reliable operation of the home transceivers coupled to the cable plant. Were a single home transceiver to fail and latch into its signal generating mode, the channel assigned to home transceivers for inbound signals could be lost. Potentially, a few transceivers could overpower the latched signal generator, but power limitation considerations may make even this inelegant, partial response unavailable. Failure of individual transceivers is impossible to prevent where low cost is a critical consideration. However, reliable system operation does not necessarily mean fail-safe operation of individual tranceivers. It can include a broader range of possibilities based on predictable operation of those tranceivers. It is desirable to provide an apparatus and method by which a failed transceiver simply disables itself. In this manner, a transmitter which has failed will disappear to the communications system. Initiation of measures to disable a transmitter may be taken upon indication that a transmitter has transmitted for a period of time exceeding in length the maximum time period allowed for transmission of a data packet.

OBJECTS OF THE INVENTION

It is an object of the present invention to provide an apparatus and method for use in communications networks such as cable television systems for disabling a transceiver from transmitting upon indication that the transceiver has been transmitting a signal for a predetermined period longer than the maximum time period allowed for transmission of a data packet.

It is a further object of the present invention to provide a modulator for use in a cable television system or local area network characterized by simplicity and low cost implementation.

It is yet another object of the present invention to provide for use in a cable television system or local area network, an apparatus and method for improving system throughout while allowing for transceiver failure.

It is a still further object of the present invention to provide for use in a cable television system or local area network, an apparatus and method to disable cable-system transceivers as a result of most typical potential component failures within such transceivers.

It is an additional object of the invention to provide a modulator transmission-inhibiting apparatus with at least one protective stage embodied in purely passive circuit elements.

DETAILED DESCRIPTION OF THE PREFERRED EMBODIMENT

The above objects are accomplished in accordance with the principles of the invention, in a first embodiment, by providing for each transceiver coupled to a cable-television system, an anti-latch circuit with two protective stages adapted to respond in a time-delayed fashion to typical broadcast mode signals appearing in or produced by the transceiver. The protective stages then act on separate facilities of the modulator of the transceiver to disable it. Thus, the protective stages can potentially accomodate failures even in the modulator.

Figure 1:
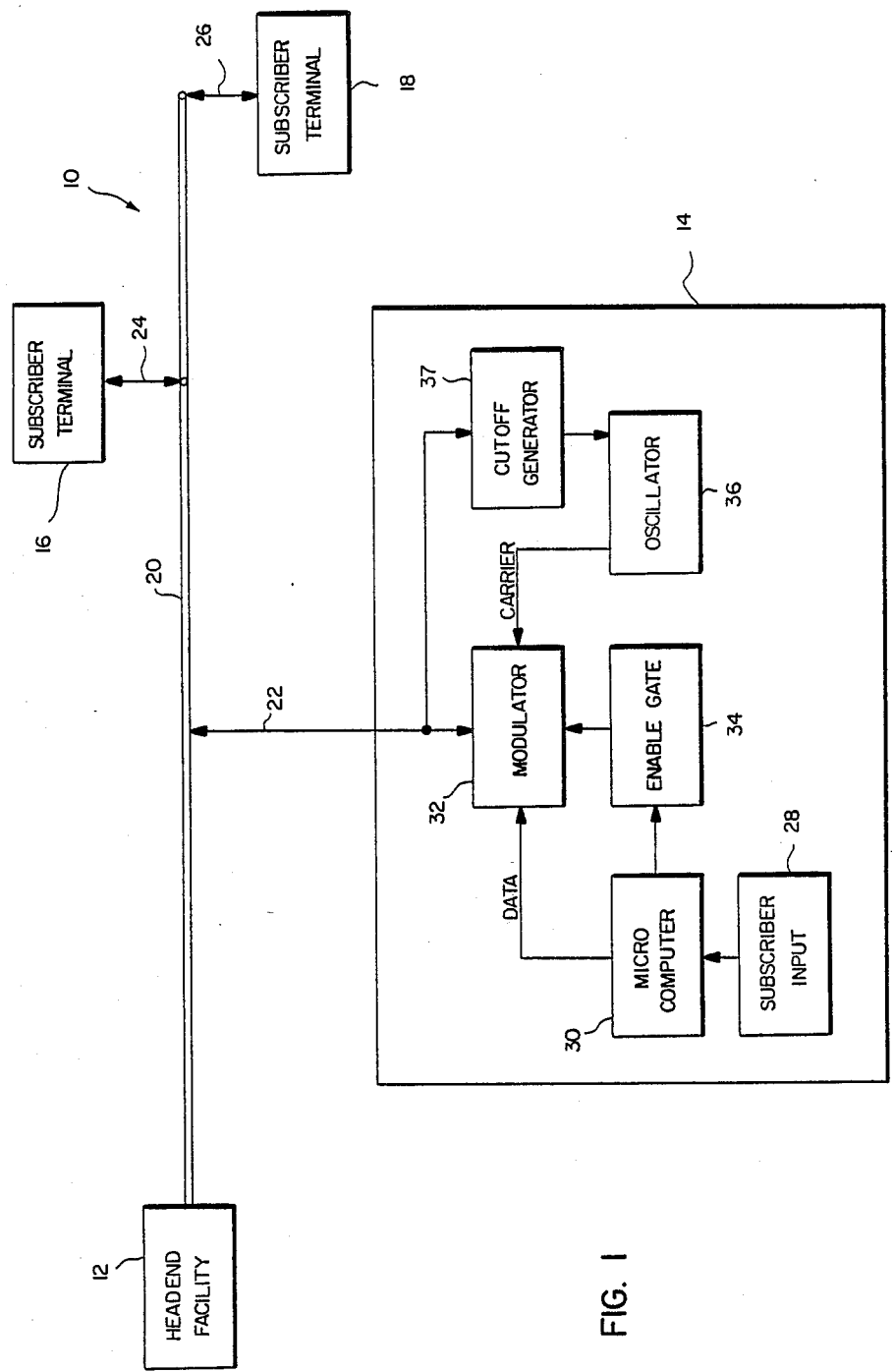
FIG. 1 is a simplified flock diagram of a two-way cable-television system embodying the principles of the present invention.

Referring to FIG. 1, there is shown in simplified block diagram form, a two-way cable television system 10 for limiting the time duration of inbound signals generated by subscriber terminals to a maximum period.

The cable-television system 10 includes a headend facility 12 from which control and programming signals are provided to a plurality of subscriber terminals 14, 16 and 18. Headend facility 12 also is adapted to receive and respond to subscriber-initiated requests transmitted from subscriber terminals 14, 16 and 18. Although FIG. 1 shows only three subscriber terminals, it is to be understood that the present invention contemplates the distribution of cable-television signals to, and receipt of subscriber initiated requests from, a large number of subscriber terminals.

The elements of the headend facility are not shown in FIG. 1 as they do not form a part of the present invention.

The cable-television system 10 includes a coaxial distribution cable 20 and a plurality of drop cables 22, 24, and 26. Typically, a subscriber terminal is connected to the distribution cable by a respective drop cable.

For simplicity, only the inbound signal generation portion of subscriber terminal 14 is discussed herein. It is to be understood that the manner in which a subscriber terminal receives and responds to outbound signals is not a part of the present invention and that subscriber terminals 16 and 18 are configured similarly to subscriber terminal 14 in pertinent detail.

Subscriber terminal 14 includes a subscriber input device 28, such as a keyboard, by which the subscriber may enter information such as a program request. Subscriber input device 28 is coupled to microcomputer 30, which may generate data in response either to inputs from the subscriber input device 28 or to headend initiated requests transmitted on an outbound channel to the subscriber terminal. To transmit an inbound signal the microcomputer 30 generates two outputs, a data output to modulator 32, and a control signal to an enable gate 34. The data output represents information to be communicated to the headend facility, while the control signal is provided to allow the modulator 32 to transmit. Enable gate 34 is adapted to permit transmission of the control signal as an enable signal, or to generate a responsive enable signal adapted to turn modulator 32 on, for a limited maximum time period T1 in response to the continuous presence of the control signal from microcomputer 30.

An additional input is provided modulator 32. The output of an oscillator 36 is coupled to modulator 32 to provide a carrier wave onto which modulator 32 modulates the data input provided by microcomputer 30. The output of modulator 32 is coupled to an oscillator cutoff signal generator 37. Generation of inbound signal by modulator 32 for a continuous period of time equal to a period T2 will result in generator 37 turning off oscillator 36, depriving modulator 32 of the carrier wave required for generation of inbound signals. In the preferred embodiment discussed below, the oscillator cutoff signal is the absence of the required level of power to drive oscillator 36. It will be understood that inbound or transmission signals are the A.C. or oscillating component of the output of the modulator.

Thus the facilities of the modulator acted upon are its required inputs for generation of inbound or transmission signals. The modulator requires input of a carrier wave, or oscillating input, in order to generate an oscillating output, and it requires an enabling signal in order to turn on at all.

A first protective stage, enable gate 34, is adapted to shunt an enabling signal away from modulator 32. This prevents operation of current sources within modulator 32. Viewed another way, the control electrodes of the current sources are normally latched to ground through the first protective stage, turning them off. In order to turn modulator 32 on, a control signal from microcomputer 30 is coupled by a capacitor to the control electrode of the aforesaid shunting means, which comprises a controllable switch, turning the switch off. Additional power sources are provided to rebias the switch to its conductive mode after a certain time delay, which is chosen to accommodate an appropriate length data-packet transmission.

A second protective stage acts to deprive the modulator 32 of the carrier wave input. Oscillator 36 generates a carrier wave when supplied with a certain minimum power supply or bias level. In the preferred embodiment, appearance of an output signal from modulator 32 is utilized to reduce the power supply to oscillator 36 over time. Should the output signal continue for too long a period, the power supplied to the oscillator 36 will be reduced below the level required to maintain oscillation.

Figure 2:
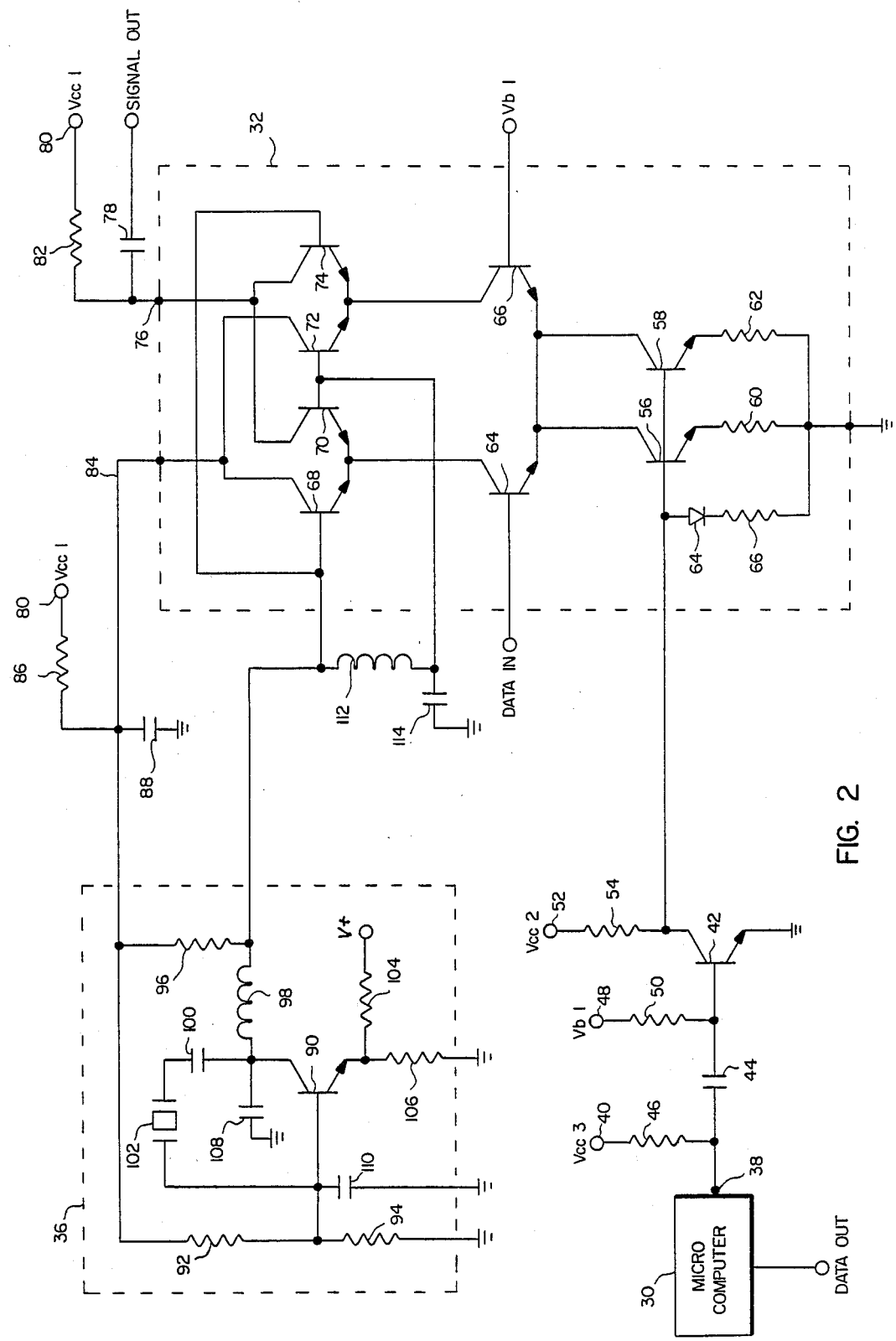
FIG. 2 is an illustrative schematic circuit diagram of an embodiment of an anti-latch transmitter in accordance with the principles of the invention.

The preferred embodiment will be disclosed in detail below. The anti-latch transmission apparatus in FIG. 2 comprises a balanced modulator 32 coupled to receive an enabling signal and a modulating wave from microcomputer 30 and to receive a carrier wave generated by oscillator 36. The output signal of modulator 32 is fed back to the power source for oscillator 36 to control the potential level input seen by oscillator 36.

Microcomputer 30 is adapted to generate a control signal at output port 38 negative relative to Vcc3 supplied at source 40. Output port 38 is coupled to the base of an NPN switching transistor 42 by an in-series capacitor 44. Voltage source 40 is connected through resistor 46 to capacitor 44 and output port 38 to cancel the negative enabling bias on capacitor 44 after microcomputer 30 has ceased transmitting the control signal. A second voltage source 48, positive relative to voltage source 40, is connected through resistor 50 to the plate of capacitor 44 common to the base of transistor 42. Voltage source 52 is connected through resistor 54 to the collector of transistor 42 and to the bases of transistors 56 and 58 in modulator 32. The potential appearing at the collector of transistor 42 is controlled by the state of transistor 42. Voltage source 48 maintains a base-to-emitter voltage on transistor 42 sufficient to drive the transistor into its conducting state in the absence of a coupled control signal from the microcomputer 30 and, accordingly, the collector of transistor 42 is pulled to ground, biasing transistors 56 and 58 into their non-conducting states.

The emitters of transistors 56 and 58 are connected by resistors 60 and 62 respectively to ground. A compensating diode 64 in series with resistor 66 provides a current path to ground from the bases of transistors 56 and 58, with the diode oriented to carry positive charge away from the bases of the transistors. The current path from power source 52 through resistor 54, diode 64 and resistor 66 establishes the desired voltage to drive transistors 56 and 58 on. Transistor 56 with resistor 60 and transistor 58 with resistor 62, when biased into conduction, approximate parallel current sources connected in common to the emitters of transistors 64 and 66.

The transistor pair comprising transistor 64 and transistor 66 provide a differential amplifier to which a modulating signal may be introduced. The base of transistor 66 is connected to a voltage bias source set at a level half way between logical 1 and logical 0, which biases transistor 66 into conduction if the current sources are operating. The base of transistor 64 is connected to a data input from microcomputer 30, the potential level of which is either at logical level 1, biasing the transistor on if the current sources are on, or at logical level 0, at which level the transistor does not conduct. According to normal differential amplifier action, conduction by transistor 64 will effectively turn transistor 66 off. The collector of transistor 64 is connected in common with the emitters of transistors 68 and 70, which form a differential amplifier at the RF modulating stage. Also at the RF modulating stage, transistors 72 and 74 form yet another differential amplifier and are connected at their commonly joined emitters to the collector of transistor 66.

The collectors of transistors 70 and 74, that is one transistor from each differential amplifier pair at the modulating stage, are joined at a common junction with an output terminal 76. The output terminal is AC-coupled by a capacitor 78 to a communications medium such as a cable television coaxial cable. Thus inbound or transmission signals comprise the oscillating component of signals generated by modulator 32, and exclude the D.C. components. Output terminal 76 is also connected to a potential source 80 by a resistor 82. The collectors of transistors 68 and 72 are joined at a common junction and coupled to power source 80 by a feedback path 84 and a resistor 86. Capacitor 88 is connected across feedback path 84 and ground.

The feedback path couples the power source 80 to crystal oscillator 36. In oscillator 36, the base of transistor 90 is connected to the feedback line 84 between elements of a voltage divider comprising resistors 92 and 94. Amplification gain to sustain oscillation is provided by transistor 90 through the path formed from the feedback path by resistor 96 and inductor 98 to the collector of transistor 90. The oscillation-sustaining feedback loop is connected from the collector of transistor 90 through an in-series capacitor 100 and crystal 102 to the base of transistor 90. The emitter of transistor 90 is connected to a voltage divider formed by resistor 104 and resistor 106. The voltage divider network helps turn off the transistor during the protective stage of operation by keeping the potential level of the emitter of transistor above ground. Capacitor 108, coupling the collector of transistor 90 to ground, and capacitor 110, coupling the base of transistor 90 to ground, complete a 360 degree phase shift of transistor gain fed back to the base of transistor 90 during oscillation.

The output of crystal oscillator 36 is taken between inductor 98 and resistor 96 and is connected to the bases of transistors 68 and 74. When this signal is oscillating it provides the carrier wave of the modulator. The output of oscillator 36 from the collector of transistor 90 is taken through inductor 98 to dampen the amplitude of the oscillator output provided modulator 32 as well as to minimize the effect of load impedance on oscillator 36 performance. An in-series inductor 112 and a capacitor 114 are connected across the bases of transistors 68 and 74 and ground, and transmit the D.C. component of the oscillator output, supplied by Vcc1, to the bases of transistors 70 and 72. A lead to provide this D.C. signal is taken between inductor 112 and capacitor 114 and is connected to the base of each of the aforesaid transistors. It will be observed that transistor 68 and transistor 70 switch on and off 180 degrees out of phase with one another when transistor 64 is conducting. Transistor 68 will be driven on during the positive cycles of the carrier signal and transistor 70 during the relatively negative cycles through the D.C. component of the signal. Similarly, transistors 72 and 74 switch on and off 180 degrees out of phase with one another. When transistor 64 is not conducting, transister 66 becomes the current path from Vcc1 to ground. Accordingly, whenever transistors 64 and 70 are on, a pulse relatively negative to Vcc1 will appear on terminal 76. Whenever transistor 64 switches off, the relatively negative pulse on port 76 will appear in response to transistor 74 turning on, which occurs 180 degrees out of phase with transistor 70. The action of transistors 68 and 72 reflects that of transistors 70 and 74. Modulator 32 will then be seen to operate as a phase shift balanced modulator. Output from the modulator will have a negative D.C. component relative to the quiescent, steady state output established by Vcc1.

The operation of the disclosed embodiment in accordance with the principles of the invention is now set forth. In the normal quiescent, or non-transmitting state of the circuit, the modulator of the anti-latch transmitting apparatus is disabled by biasing transistors 56 and 58 into their non-conducting state. This is maintained by the steady state potential level being applied to capacitor 44. Voltage source 48 through resistor 50 maintains a positive base-to-emitter bias on transistor 42, keeping the transistor in its conducting state. Accordingly, the collector of transistor 42 is pulled to ground and essentially no voltage level difference appears across the base-to-emitter junctions of transistors 56 and 58. Accordingly, the compensated current sources formed by transistors 56 and 58 are biased off, creating an open circuit in modulator 32.

It will be understood that oscillator 36 continues to generate an oscillating signal and thereby supplies a carrier wave to modulator 32 even though the modulator is not enabled. Voltage source 80 provides an appropriate turn-on potential level at the base of transistor amplifier 90 through resistor 92 and across resistor 94. The feedback loop comprising capacitor 100 and crystal 102 completes the feedback path from transistor amplifier 92 to sustain the oscillation. In the quiescent stage, no data input or modulating wave will be supplied transistor 64 and the transistor will be biased off. Transistor 66 will be biased off because the current sources are off. Accordingly, modulator 32 draws no current from potential source 80 and essentially no signal is produced. The output at terminal 76 will be maintained at Vcc1, transmission of which to the cable plant will be blocked by capacitor 78. Potential source 80 will also establish the power level supplied to oscillator 36 across capacitor 88 at a level appropriate to sustain oscillation.

The protective aspects of the circuit of the invention come into play when the microcomputer 30 first generates a control signal. To begin data transmission, the circuit controller will apply a control signal on output terminal 38 and shortly thereafter begin sending a binary data stream, i.e. a modulating wave, to the base of transistor 64. The control signal will be coupled by capacitor 44 to the base of transistor 42, driving the base-to-emitter voltage low and driving the transistor into its non-conducting state. Although potential source 48 will begin to recharge capacitor 44, the rate at which the capacitor recharges will be controlled by resistor 50 as well as its own capacitance. Potential source 52 will meanwhile bring the collector voltage of transistor 42 high and bias transistors 56 and 58 into conduction until transistor 42 begins conducting again.

In normal transmitting operation, balanced modulator 32 operates according to the principles of binary phase shift keying, commonly referred to as BPSK. The output signal on feedback line 84 would be shifted 180 degrees with respect to the output signals appearing on output port 76, but for capacitor 88 which filters the A.C. component out and maintains, for a time, the D.C. bias level on the feedback line required for oscillation.

The current path through modulator 32 will be determined upon whether the input data stream has driven transistor 64 into conduction or not. Each transition between logical level 1 or 0 in the modulating wave will produce opposite 180 degree phase shifts in the oscillating outputs of the differential amplifiers at the modulating stage. Further clarifying modulator action, it will be seen that a data input at logical level 0 on the control electrode of transistor 64 and an input at logical level ½ to transistor 66 will give rise to two alternating conduction paths through modulator 32 to ground. Arbitrarily choosing a first phase, its current path will initially be from feedback line 84 to transistor 72 and transistor 66. In the opposite phase, the path will be through resistor 82 and transistor 74 to transistor 66.

A shift from logical level 0 to logical level 1 input to transistor 64 will change the alternating conduction paths in modulator 32. In the first phase a conduction path will appear through resistor 82, transistor 70 to transistor 64. In the opposite phase the path will be from feedback line 84, through transistor 68 to transistor 64. All current paths include the current sources from the commonly joined emitters of transistors 64 and 66.

In that transistors 70 and 74 would switch on in opposite phases, a shift in conduction from transistor 66 to transistor 64 produces a phase shift in the output on port 76. Feedback line 84 sees an opposite phase shift from transistors 68 and 72.

It will be understood that the output signals have a negative D.C. component relative to potential source 80. However, the potential appearing on feedback loop 84 is for a time substantially maintained at a level required to cause oscillation by oscillator 36. This is done by choosing a relatively high capacitance for capacitor 88.

In order to effect the second protective stage of the invention, the value for resistor 86 is chosen such that the modulator, when on, draws more current from feedback line 84 then potential source 80 can supply through resistor 86 while maintaining the original bias voltage on feedback line 84. Capacitor 88 will temporarily supply the difference. Accordingly, in response to modulator action, the voltage level across capacitor 88 will begin to fall. Eventually it will fall to a level below that required to maintain oscillation in oscillator 36.

In normal operation, microcomputer 30 will turn off the control signal on output port 38 after a brief maximum period, and power source 40 will quickly drive the base bias voltage on transistor 42 high, shunting its collector voltage to ground and thereby disabling the modulator. However, where the microcomputer fails, or otherwise indicates continued transmission, power source 48 through resistor 50 will begin to recharge capacitor 44, and the voltage appearing at the base of transistor 42 will begin to rise. After a certain time period, T1, transistor 42 will begin to conduct, shunting the potential at the bases of transistors 56 and 58 to ground and turning those transistors off, disabling modulator 32. The values for resistor 50 and capacitor 44 will be selected to insure that the period T1 is long enough to accommodate permissible data signals, but brief enough to prevent modulator 32 from transmitting an inbound signal on the dedicated channel in the cable-television system for an excessive period of time.

It may also be seen that a failure of transistor 42 in its on or conducting mode, such as may occur from an excessive transient voltage, will simply disable the transmitter. With transistor 42 conducting, transistors 56 to 58 will not conduct and the modulator will be turned off.

However, if transistor 42 fails in a non-conducting state, or transistors 56 or 58 otherwise continue to operate, modulator 32 will continue to be enabled and will generate a signal on output terminal 76 and feedback line 84. Where oscillator 36 continues to operate, this signal will include an oscillating component, which will be transmitted via capacitor 78 to the transmission medium, occupying the dedicated channel of the cable-television system as an inbound signal.

The second protective stage of the embodiment of the invention responds to disable oscillator 36 in the event of such failures. Operation of modulator 32 implies that current paths will continue to be provided through the modulator from feedback loop 84 to ground. Accordingly, modulator operation will draw current from feedback line 84. Viewed another way, the feedback line, in conjunction with capacitor 88, act to integrate over time, the D.C. component of the signal generated by modulator 32 to generate a turn off signal to oscillator 36. To insure that the output signal appearing on terminal 76 does not decay in signal level or vary noticably in frequency during the allowed time for transmission, the values of resistor 86, the elements of oscillator 36, modulator 32 and capacitor 88 determine a time constant T2, which is substantially longer then the permissible period for inbound signals, but short enough that the failed transceiver will not generate signals so long as to affect system or network performance. The bias supplied the oscillator will not vary noticably during the allowed time for transmission.

When oscillator 36 ceases oscillating, the bias potential appearing at the bases of transistors 68, 70, 72 and 74 will be equal, biasing all the transistors into conduction and the output signal on terminal 76 and on feedback line 84 will become a D.C. signal. Transmission of the D.C. signal to the transmission medium will be blocked by capacitor 78 and the channel will be open for access by other stations. The potential appearing on feedback line 84 will degrade to a steady state value determined by the voltage divider effect of resistor 86, the current sources of the modulator circuit 32, resistors 92 and 94 and the other elements of oscillator 36.

Determination by a network controller or the headend facility 12 that a specific transmitter has been disabled may be made through conventional pulling techniques. The inability of the unit to respond to inquiry from the headend facility will tag it as a unit which requires attention.

While a particular embodiment of the invention has been described and shown, it will be understood that many modifications may be made without departing from the spirit thereof, and it is contemplated that the claims covering any such modifications will fall within the true spirit and scope of the invention.

What is claimed is:

1. In a transceiver coupled to transmit signals onto a cable television system cable plant or broadband cable communications network, the improvement comprising:
   a modulator for generating a transmission signal in response to an enabling signal and carrier wave;
   means responsive to said enabling signal effective to transmit said enabling signal to said modulator for a continuous period on longer than a first predetermined maximum time period;
   means for providing said carrier wave to said modulator; and
   carrier wave cut-off means responsive to said modulator and coupled to said carrier wave providing means for preventing said carrier wave from being supplied to said modulator if and when said transmission signal has been generated for a continuous period equal to a second predetermined maximum time period.

2. For use in a cable television system or broadband cable communications network, apparatus for limiting the continuous generation of a transmission signal by a modem to a predetermined maximum time period comprising:
   circuit controlling means for providing a modulating wave and at least a first control signal;
   switching means for providing an enable signal in response to said first control signal and not to provide said enable signal otherwise;
   means for coupling said first control signal to said switching means for a continuous time period less than said predetermined maximum time period and blocking said first control signal thereafter absent discontinuity in said first control signal;
   an oscillator for generating a carrier wave;
   oscillator bias means for supplying power to said oscillator;
   a modulator for generating an output signal in response to said enable signal and a transmission signal in response to said carrier wave and said enable signal; and
   feedback means coupling the output signal of said modulator to said oscillator bias means for controlling the application of power supplied to said oscillator, such that the power supplied to said oscillator is reduced below the level required to maintain oscillation after a continuous time period equal to said predetermined maximum period, thereby preventing generation of said carrier wave.

3. Apparatus as set forth in claim 2 wherein said means for coupling said first control signal includes a blocking capacitor and at least a first potential source connected to said capacitor by a resistor whereby said control signal is suppressed within a time period T1.

4. Apparatus as set forth in claim 3 wherein said switching means includes:
   a shunting transistor adapted to be biased into its conducting state in response to said first potential source and into its non-conducting state in response to said first control signal being coupled to its control electrode by said blocking capacitor; and
   a power source connected by a resistor across the collector to the emitter of said shunting transistor.

5. Apparatus as set forth in claim 4 wherein said enable signal is related to the potential level appearing on the collector of said shunting transistor in its non-conducting state.

6. Apparatus as set forth in claim 2 wherein said feedback means includes a conductive path connected to an output terminal of said modulator from which said oscillator takes its power supply.

7. Apparatus as set forth in claim 6 wherein said oscillator bias means includes an oscillator bias level source coupled to said conductive path by a resistive element and a capacitor coupled across said conductive path and a non-varying level of potential.

8. For use in a cable television system or broadband cable communications network, time-duration-limited transmission signal generating means coupled to transmit signals onto a cable plant, comprising:
   means for generating a D.C. control signal;
   an oscillator for generating a carrier wave;
   enabling means for providing an enabling signal in response to said D.C. control signal and for providing a disabling signal in the absence of said D.C. control signal or where said D.C. control signal has had a continued duration in time equal to or exceeding a first time-duration-limited period;
   means for generating an output signal in response to said enabling signal and a transmission signal in response to said enabling signal and said carrier wave;
   oscillator bias means for supplying power to said oscillator; and
   feedback means coupling said output signal to said oscillator bias means for reducing the power supplied to said oscillator below the level required to maintain generation of said carrier wave, where said output signal has appeared for a continuoius time period equal to a second time-duration-limited period.

9. Time-duration-limited signal generating means as recited in claim 8 wherein said first time duration limited period is less than said second time duration limited period.

10. Time-duration-limited signal generating means as recited in claim 8 wherein said oscillator bias means includes a source of oscillation sustaining bias connected to said feedback means by a resistor and a capacitor connected across said feedback means and a non-varying potential level.

11. Time-duration-limited transmission signal generating means as recited in claim 8 wherein said enabling means includes;
   an enabling signal switching transistor for applying said enabling signal to said generating means in response to application of said control signal to the control electrode of said switching transistor;

a capacitor connected in series with the control electrode of said switching transistor for coupling said control signal to said control electrode; and a D.C. bias source connected by a resistor to the common junction of the control electrode of said switching transistor and said capacitor for cancelling said control signal within said first time-duration-limited period.

12. For use in a cable television system or broadband communications network, time-duration-limited transmission signal generating means comprising:

a source of operating power;

means for generating a carrier wave in response to said operating power exceeding a given level;

a modulator responsive to said carrier wave to generate a transmission signal; and feedback means coupling an output signal associated with said transmission signal from said modulator to said power source for reducing the power supplied to said carrier wave generating means below said given level whenever the output signal has appeared for a continuous time period longer than a time-duration-limited period.

13. Time-duration-limited transmission signal generating means as recited in claim 12 wherein said power source includes a source of oscillation sustaining bias connected to said feedback means by a resistor, and a capacitor connected across said feedback means and a non-varying potential level.

14. In a two-way cable television system or a two-way broadband communications network comprising a plurality of transceivers for transmitting inbound signals to a system or network head end facility on a predetermined channel, the improvement wherein each of said transceivers comprises:

means for generating a control signal;

means for providing a carrier wave;

means responsive to said control signal for developing an enabling signal for a continuous time period no longer than a first maximum time period;

modulator means, activated by said enabling signal for generating an output signal and further activated by said enabling signal and said carrier wave for generating an inbound transmission signal; and carrier wave cut-off means responsive to said output signal, and coupled to said carrier wave providing means for preventing said carrier wave from being supplied to said modulator means if and when said output signal has been generated for a continuous period equal to a second maximum time period;

whereby continuous inbound transmission signals from each of said plurality of transceivers is limited to a maximum time period, thereby preventing any one transceiver from latching in a transmission mode and blocking access to said predetermined channel to the remaining transceivers.

15. In a two-way cable television system or two-way broadband cable communications network, comprising a plurality of transceivers for transmitting inbound signals to a head end facility on a predetermined frequency, each of said transceivers including a modulator responsive to an enabling signal to generate an output signal and to said enabling signal and a carrier wave input to generate an inbound signal, for as long as said enabling signal and said carrier wave input continue, a method for limiting the continuous time duration of inbound signals generated by each of said transceivers, comprising the steps in each transceiver of:

preventing generation of said enabling signal after its continuous generation for a period equal to a first maximum time period; and suppressing said carrier wave in response to generation of said output signal for a period equal to a second maximum time period.

16. A method for limiting the time duration of inbound signals in a two-way cable television system or two-way broadband cable communications network, comprising the steps in each of a plurality of transceivers of:

generating an inbound signal in response to a carrier wave and an enabling signal for as long as said enabling signal and said carrier wave continue;

suppressing said enabling signal after its continuous presence for a period equal to a first maximum time period; and suppressing said carrier wave in response to generation of said inbound signal for a continuous period equal to a second maximum time period.

17. A method for limiting the time duration of inbound signals in a two-way cable television system or a two-way broadband cable communications network, comprising the steps in each of a plurality of transceivers of:

operating a modulator for generating an inbound signal in response to a carrier wave and an enabling signal for as long as said carrier wave continues and an output signal in response to said enabling signal;

establishing a predetermined continuous timing interval; and suppressing said carrier wave in response to generation of said output signal by said modulator for a continuous time period exceeding said predetermined continuous timing interval.

* * * * *